United States Patent [19]
Loomis

[11] Patent Number: 6,014,101
[45] Date of Patent: *Jan. 11, 2000

[54] POST-PROCESSING OF INVERSE DGPS CORRECTIONS

[75] Inventor: Peter V. W. Loomis, Sunnyvale, Calif.

[73] Assignee: Trimble Navigation Limited, Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/954,645

[22] Filed: Oct. 20, 1997

Related U.S. Application Data

[63] Continuation of application No. 08/607,176, Feb. 26, 1996, Pat. No. 5,680,140.

[51] Int. Cl.$^7$ .................................................. G01S 5/02
[52] U.S. Cl. ............................. 342/357.02; 342/357.06; 701/214
[58] Field of Search .................. 342/357, 352; 455/12.1; 701/213, 215, 214

[56] References Cited

U.S. PATENT DOCUMENTS

| | | | |
|---|---|---|---|
| 4,578,678 | 3/1986 | Hurd | 343/357 |
| 4,809,005 | 2/1989 | Counselman, III | 342/352 |
| 4,894,662 | 1/1990 | Counselman | 342/357 |
| 4,972,431 | 11/1990 | Keegan | 375/1 |
| 5,148,179 | 9/1992 | Allison | 342/357 |
| 5,266,958 | 11/1993 | Durboraw, III | 342/357 |
| 5,323,322 | 6/1994 | Mueller et al. | 364/449 |
| 5,359,521 | 10/1994 | Kyrtsos et al. | 364/449 |
| 5,375,059 | 12/1994 | Kyrtsos et al. | 364/449 |
| 5,390,124 | 2/1995 | Kyrtsos | 364/445 |
| 5,390,125 | 2/1995 | Sennott et al. | 364/449 |
| 5,430,654 | 7/1995 | Krytsos et al. | 364/449 |
| 5,430,657 | 7/1995 | Kyrtsos | 364/459 |
| 5,436,632 | 7/1995 | Sheynblat | 342/357 |
| 5,438,517 | 8/1995 | Sennott et al. | 364/449 |
| 5,450,448 | 9/1995 | Sheyblat | 375/346 |
| 5,451,964 | 9/1995 | Babu | 342/357 |
| 5,467,282 | 11/1995 | Dennis | 364/449 |
| 5,471,217 | 11/1995 | Hatch et al. | 342/357 |
| 5,477,458 | 12/1995 | Loomis | 364/449 |
| 5,495,257 | 2/1996 | Loomis | 342/357 |
| 5,680,140 | 10/1997 | Loomis | 342/357 |

OTHER PUBLICATIONS

R. Courant and D. Hilbert, "Methods of Mathematical Physics," vol. 1, pp. 50–51, Interscience Publishers, New York, 1937.

(List continued on next page.)

*Primary Examiner*—Thomas H. Tarcza
*Assistant Examiner*—Dao L. Phan
*Attorney, Agent, or Firm*—John F. Schipper

[57] ABSTRACT

A method for enhancing the accuracy of location coordinates and/or clock bias computed for a mobile user station that is part of a Satellite Positioning System (SATPS), such as GPS or GLONASS. A data processing station is provided with pseudorange corrections PRC(t;j;ref) for an SATPS reference station for each of M SATPS satellites (j=1, ..., M; M≧3) and with uncorrected location fix coordinates x'($t_f$), y'($t_f$)', z'($t_f$)' and/or b'($t_f$) for the mobile station for a selected location fix time $t_f$. A matrix equation H($t_f$;mob)ΔW($t_f$;mob)=PRC($t_f$;ref) relates a matrix ΔW of location fix coordinate corrections for the mobile station to a matrix PRC(t;ref) of the pseudorange correction values, where H($t_f$;mob) is an M×N matrix (M≦N; N=3 or 4) with known entries computed from mobile station data. An inverse or pseudo-inverse matrix H($t_f$;mob)$^{(-1)}$ is formed satisfying the relation H($t_f$;mob)$^{(-1)}$H($t_f$;mob)=the identity matrix I, and the matrix ΔW($t_f$;mob)=H($t_f$;mob)$^{(-1)}$PRC($t_f$;ref) is computed. The entries of the matrix ΔW($t_f$) are interpreted as additive corrections for the location fix coordinates x'($t_f$), y'($t_f$)', z'($t_f$)' and/or b'($t_f$) for the mobile station. Post-processing can be performed to apply the pseudorange corrections to the mobile station data.

14 Claims, 5 Drawing Sheets

OTHER PUBLICATIONS

Tom Logsdon, "The Navstar Global Positioning System," pp. 1–90, Van Nostrand Reinhold, 1992.

"Navstar GPS Space Segment/Navigation User Interfaces," Interface Control Document GPS(200), No. ICD–GPS–200, Rockwell International, Satellite Systems Division, Rev. B–PR, IRN–200B–PR–001, Apr. 16, 1993.

Jorgensen, "Navstar/Global Positioning System 18–Satellite Constellations," Navigation, vol. 2, pp. 1–12, Appendix B. 1984.

POST-PROCESSING OF INVERSE DGPS CORRECTIONS

This application is a continuation of a patent application, U.S. Ser. No. 08/607,176, now U.S. Pat. No. 5,680,140 entitled "Post-Processing of Inverse Differential Corrections For SATPS Mobile Stations," assigned to the same assignee. This invention relates to enhancement of the accuracy of spatial location coordinates and clock bias provided by a Satellite Positioning System, such as GPS or GLONASS.

FIELD OF THE INVENTION

BACKGROUND OF THE INVENTION

Development of Satellite Positioning Systems (SATPSs), such as the Global Positioning System (GPS) in the United States and the Global Orbiting Navigational System (GLONASS) in the former Soviet Union, has allowed location coordinates of an object on or near the Earth to be determined with improved accuracy. Under ordinary circumstances, these location coordinates can be determined with an inaccuracy of no more than 30 meters. In order to further improve the accuracy provided by SATPS location determination, differential GPS (DGPS), and more generally differential SATPS (DSATPS), has been introduced and used. A DSATPS can provide locations with inaccuracies as low as a few meters, or lower in some instances. Implementation of a DSATPS requires that an SATPS reference station, whose location coordinates are known with high accuracy (to within a fraction of a meter) be provided to receive the normal SATPS signals from an SATPS satellite. The reference station compares its known pseudorange, based on its known location and known satellite and clock biases, with the pseudorange computed using the acceptable SATPS signals received from each visible satellite. The difference, called a pseudorange correction, between the known pseudorange and the computed pseudorange is transmitted for each such SATPS satellite, along with an indicium that identifies that satellite. A mobile SATPS station within 100–1000 kilometers (km) of the reference station receives and uses these pseudorange corrections o correct its own SATPS-determined pseudorange values for each acceptable satellite signal. The pseudorange corrections must be received and processed at the mobile station.

Several problems are presented here. First, this process assumes that the pseudorange corrections, determined at the SATPS reference station, are also valid at the mobile SATPS station, which may be spaced apart from the reference station by as much as 1000 km. This assumption may be unjustified if the local ionosphere and/or the local troposphere is undergoing relatively rapid change with time, or if the multipath signals that contribute to the pseudoranges at the two stations are substantially different.

Second, this process requires that the pseudorange corrections always be transmitted to and used at the mobile SATPS station. In some situations, it may be more convenient to transmit or to download the mobile station pseudorange information to the reference station, or to another supplemental processor station, and to allow the supplemental station to do the processing and subsequent analysis.

Third, the variables actually determined are not the pseudoranges but the locations themselves. A single central station and associated GPS reference station may service a large number of mobile users, each with a different location in the field. The pseudorange corrections for each user varies with the user's actual location in the field. In a tracking application, for example, the GPS-determined location of a mobile user is determined and transmitted to a central station for accumulating a time history of the user's location and for subsequent analysis, using the corrections determined by a GPS reference station at or near the central station. In a mapping application, a sequence of GPS-determined locations are computed and stored in a file in a mobile user's GPS receiver/processor. This file is stored at the central station, to use the corrections determined by a GPS reference station at or near the central station and to develop a corrected set of locations for sites that were earlier mapped by the user.

Although measurements and use of pseudoranges are fundamental to SATPS-assisted determination of location and/or time coordinates, only a few patents disclose procedures that work directly with the pseudorange values. In U.S. Pat. No. 4,578,678, Hurd discloses a GPS receiver that receives a plurality of pseudorange signals, compares these signals with replicas of the expected pseudorange signals, using a correlation technique, and determines the associated time delay, frequency and other variables of interest for these signals to determine receiver location, velocity, clock offset and clock rate.

Keegan discloses a P-code receiver/processor, in U.S. Pat. No. 4,972,431, that analyzes pseudorange and phase for encrypted GPS signals by squaring and filtering the incoming signals. Weaker signals can be analyzed using this technique.

A multi-antenna for GPS signals that determines time biases in the carrier frequencies from time averaging in simultaneous pseudorange measurements is disclosed by Counselman in U.S. Pat. No. 4,809,005. GPS antennas are placed on a seismic survey vessel and on a towed vessel to sense and compensate for false signals received by the seismic vessel antenna(s), and present location of the survey vessel is determined. Similar techniques are disclosed by Counselman, in U.S. Pat. No. 4,894,662, for determining present location using only C/A signals transmitted by the satellites.

Allison, in U.S. Pat. No. 5,148,179, discloses a method for using double differences of pseudorange and carrier phase measurements. The technique uses double differences formed from signals received from four satellites by two different receivers to eliminate certain bias and atmospheric perturbation terms.

A GPS receiver that uses conventional pseudorange and carrier phase measurements to provide a directional indicator, such as a compass, is disclosed in U.S. Pat. No. 5,266,958, issued to Durboraw. A single antenna is moved in a closed path, and differences between predicted and actual carrier phases are used to determine location perturbations, which are then resolved into components parallel and perpendicular to a desired path heading in a given plane.

A networked differential GPS corrections system that provides interpolation of pseudorange corrections (PRCs) between adjacent GPS reference stations is disclosed in U.S. Pat. No. 5,323,322, issued to Mueller et al. Iso-PRC contour specifications are constructed for the regions between the network of reference stations and are transmitted for use by nearby mobile stations.

Kyrtsos et al, in U.S. Pat. No. 5,359,521, disclose positioning of two GPS signal antennas a known distance apart on a vehicle. The pseudorange measurements made at each GPS antenna from GPS signals received from the same satellite are constrained, and the inherent antenna location inaccuracy is assertedly reduced, by accounting for the fixed separation of the two antennas.

U.S. Pat. No. 5,375,059, issued to Kyrtsos et al, U.S. Pat. No. 5,390,125, issued to Sennott et al, and U.S. Pat. No. 5,438,517, issued to Sennott et al, each disclose provision of a first vehicle location, using pseudorange measurements derived from a plurality of GPS satellites and from one or more pseudolites, and simultaneous provision of a second vehicle location derived from an odometer and/or an inertial reference system. The first and second vehicle location are reconciled to provide a third location estimate, using various statistical and/or predictive techniques.

Accuracy of a vehicle location estimate using GPS signals is improved by inclusion of compensation for certain non-linear errors in the measurements in U.S. Pat. No. 5,390,124, issued to Kyrtsos. Four error coefficients are introduced to model errors inherent in the x-, y- and z-coordinates and in the corresponding pseudorange values.

Kyrtsos et al, in U.S. Pat. No. 5,430,654, disclose provision of a plurality of GPS signal receivers near each other to perform pseudorange measurements from GPS signals received from a given satellite. the pseudorange measurements are then averaged, using appropriate weights, to determine an optimal pseudorange for the general location where the pseudorange measurements are made. Kalman filtering is employed for data extrapolation.

In U.S. Pat. No. 5,430,657, issued to Kyrtsos, the inventor proposes to predict GPS location of a given satellite, using pseudorange and pseudorange rate measurements, and Kalman filter predictions therefrom, made at a sequence of three or more closely spaced times. The inventor asserts that determination of satellite locations by this approach does not rely upon satellite ephemeris data.

Integrity monitoring of the pseudorange and pseudorange rate corrections provided by an SATPS reference station, using an immobile, nearby signal integrity monitoring (SIM) station, is disclosed by Sheynblat in U.S. Pat. No. 5,436,632. If the magnitudes of certain error terms computed by the SIM station are less than threshold values for at least three SATPS satellites, differential SATPS corrections generated by the associated reference station can be used to determine corrected location and velocity coordinates for mobile stations near the associated reference station.

Sheynblat discloses removal of errors from code minus carrier signals due to multipath and/or receiver signal error in U.S. Pat. No. 5,450,448. The code minus carrier signals are modified by one or more statistical processing filters to extract the different signal error components.

U.S. Pat. No. 4,451,964, issued to Babu, discloses provision of pseudorange and carrier phase data from a GPS reference station to a mobile station via a communications link. The mobile station receives these data, applies Kalman filtering and the known reference station and satellite locations to compute pseudorange and carrier phase corrections for itself. Velocity and clock error estimates for the mobile station are determined and used to obtain carrier phase-based estimates of the mobile station location.

Use of pseudorange measurements from GPS satellite signals and from geostationary satellites, plus GPS differential corrections, to provide a location estimate with improved accuracy is disclosed by Dennis in U.S. Pat. No. 5,467,282.

Hatch et al disclose a method for smoothing and reconciling pseudorange (code phase) measurements and carrier phase measurements performed in a GPS signal receiver/processor, in U.S. Pat. No. 5,471,217. Ionospheric and Doppler shift effects are removed from the code phase signals and the results are filtered over extended time intervals.

In U.S. Pat. No. 5,477,458, issued to Loomis, a network of three or more fiducial stations for corrections of carrier phases or of pseudoranges, applicable over a region as large as 3000 km in diameter, is disclosed. A mobile station determines its initially uncorrected location, then determines and applies the carrier phase or pseudorange corrections as provided by the network.

These patents measure pseudoranges, usually at a single station, and apply complex analysis to determine as much as possible from these single-station measurements. Where differential GPS or SATPS pseudorange corrections are sought, a procedure must be found to allow consistent sharing of these corrections and to provide consistent determination of the corresponding location coordinate and clock bias corrections for a reference station and one or more mobile stations that communicate with the reference station.

What is needed is a method and apparatus for converting a mobile user's uncorrected SATPS-determined location in the field to the equivalent uncorrected pseudoranges at the user's location, applying the corrections to the pseudorange values ("innovations") appropriate for the user's location, and determining the user's corrected location coordinates. The pseudorange corrections should be based on the mobile user's location, not on the location of a reference station used for initially determining these corrections. Preferably, this method should be implementable by modest changes made to the existing SATPS location determination software and with no changes in the associated hardware carried by the reference station or by the mobile user. Preferably, this method should allow, but not require, post-processing and should also allow immediate exchange of data for pseudorange corrections, and the amount of data downloaded for processing should be minimized. Preferably, processing of the data should be possible at the reference station, at the mobile station, or at any other supplemental data processor station.

SUMMARY OF THE INVENTION

These needs are met by the invention, which provides a method for converting uncorrected SATPS-determined location coordinates at the mobile station location into location coordinates that are corrected using pseudorange differences or innovations, based on measurements of these differences at the reference station. In a first embodiment of the method, SATPS signals from the same M SATPS satellites ($M \geq 3$ or 4) are received at each of an SATPS mobile station and a SATPS reference station, and the satellite pseudoranges and location and time coordinates for that station are determined. The satellite pseudorange corrections and other observable errors are represented by an M×1 column matrix $PRC(t_f;mob) \approx PRC(t_f;ref) = PR(t_f;ref) - PR(t_f;ref)_0$, where the entries of the matrix $PR(t_f;ref)_0$ represent the uncorrected pseudorange signals for received at the reference station and $t_f = t_{fix}$ is the time at which the original, uncorrected pseudorange measurements were made. The pseudorange corrections matrix is related to a 4×1 (or 3×1) matrix $\Delta W(t_f;mob)$ of spatial location coordinate and (optionally) clock bias corrections x, y, z and $b = c\Delta t(clock)$ (c=light propagation velocity) by a matrix equation $PRC(t_f;mob) = H(t_f;mob) \Delta W(t_f;mob)$, where $H(t_f;mob)$ is an M×4 (or M×3 or M×2) matrix whose coefficients are determined from the known vectors that extend from the nominal solution location to the locations of the M satellites at the location fix time $t = t_f$. This matrix equation applies at a mobile station.

The pseudorange corrections for the reference station $PRC(t;ref)$ are computed, using the known spatial location and (optionally) clock bias coordinates of the reference station, as in conventional differential SATPS corrections. The column vectors of the matrix $H(t_f;\text{mob})$ span a four-dimensional subspace $S_H$ of an M-dimensional space $S_{H^*}$, and the matrix H is augmented to become an M×M matrix $H^*(t_f;\text{mob})$ in the space $S_{H^*}$. If M=4, the augmented matrix $H^*$=H and $S_{H^*}$=$S_H$. If M≧5 (the normal situation), the space $S_H$ is a proper subset of the space $S_{H^*}$. This extends to a situation with M≧3, using two spatial location coordinates and clock bias, or using three spatial location coordinates.

In many practical situations, correction to the clock bias coordinate b and/or to the coordinate z is not needed here and is ignored. In such situations, the matrix $H(t_f;\text{mob})$ spans a three-dimensional subspace and M≧3. If M=3, the augmented space $S_{H^*}$=$S_H$. If M≧4, the space $S_H$ is a proper subset of the augmented space $S_{H^*}$. For completeness, it will be assumed in the following that all four location fix coordinates x, y, z and b are of interest, with M≧4. If the clock offset coordinate b is not of interest, reference to this coordinate can be deleted and the dimension of the subspace $S_H$ is reduced to 3 in the following discussion.

The matrix $H^*$ is invertible within $S_H$, and the matrix $(H^*)^{-1}$ and/or the matrix H is determined at the reference station or at the mobile station, using an initial, uncorrected estimate of the location of the mobile station at time $t=t_f$. The spatial location/time coordinate matrix $\Delta W(t;\text{mob})$ is augmented to become an M×1 column matrix $\Delta W^*$ in the space $S_{H^*}$. The uncorrected spatial location and clock bias coordinate vector $W(t_f;\text{mob})$ (referred to as a "location fix coordinate vector") for the mobile station is combined with the reference station data at the supplemental data processor station, and a location fix coordinate corrections vector $\Delta W^*(t_f;\text{mob})=H^*(t_f;\text{mob})^{-1}PRC(t_f;\text{mob})$ is constructed from this information for the mobile station location fix coordinates. The uncorrected pseudorange values for the mobile station are combined with the pseudorange corrections for the reference station to determine the corrected pseudorange values and corrected spatial location and clock bias coordinates for the mobile station. Computations are performed at the reference station, at the mobile station, or at another supplemental data processing station.

This approach provides at least two major benefits. First, this approach requires only storage (optional), downloading and processing of as few as four (or three) location fix coordinate values, and the dynamic ranges of these coordinate values are usually limited to a few hundred kilometers or less. Thus, relatively few bits (as few as 16 per coordinate) are required for communication of the location fix coordinate information. Second, this approach uses the uncorrected mobile station location coordinates, with an estimated initial inaccuracy of no more than 30 meters, to determine the pseudorange corrections, rather than using the location coordinates of the reference station, which can be displaced from the mobile station by as much as a few hundred kilometers.

DESCRIPTION OF BEST MODE OF THE INVENTION

Figure 1:
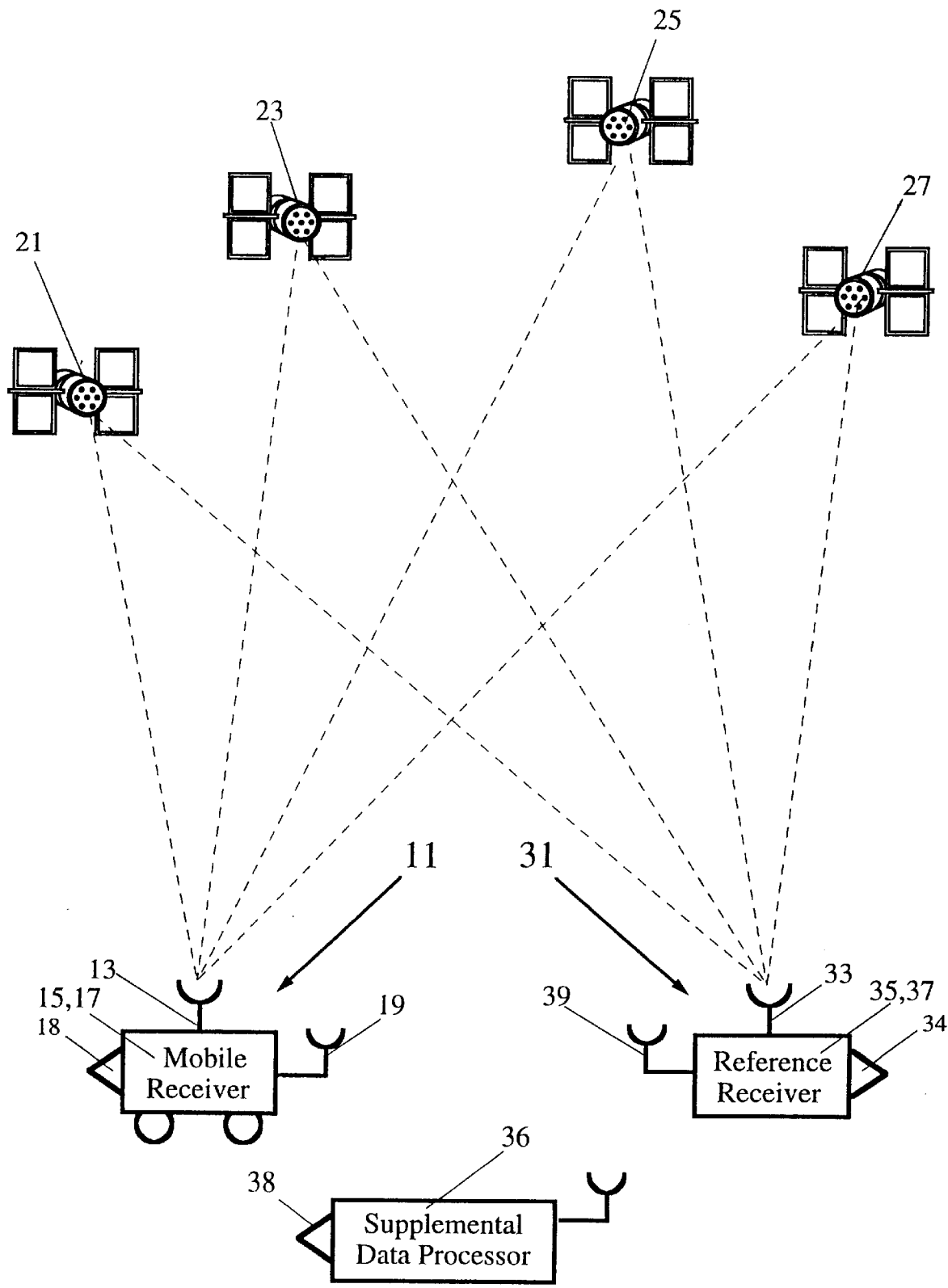
FIG. 1 is a schematic view of an environment in which the invention can be used.

An SATPS mobile station 11 carries an SATPS signal antenna 13 and associated SATPS signal receiver/processor 15 and a mobile station downloader and associated port 18 (or transmitter and associated antenna) that are connected to the SATPS receiver/processor 15, in one embodiment of the invention shown in FIG. 1. The mobile station 11 receives SATPS signals from M (≧4) SATPS satellites 21, 23, 25 and 27. Receipt of these signals allows the user to calculate the uncorrected, SATPS-determined present spatial location coordinates $x_{unc}$, $y_{unc}$, $z_{unc}$ and clock bias coordinate $b_{unc}$, referred to as location fix coordinates $(x,y,z,b)_{unc}$, of the SATPS antenna 13 in a selected coordinate system. The spatial location coordinates (x,y,z) may be expressed in any coordinate system and are not limited to a Cartesian system. The mobile station downloader 18 permits downloading (or transmission) of the uncorrected location fix coordinates $(x,y,z,b)_{unc}$ to an SATPS supplemental data processor station ("supplemental station") that may be spaced apart from the mobile station 11 and/or reference station 31 while these stations are collecting data, for subsequent processing by the supplemental station. The location coordinates of the SATPS reference station 31 are known with high accuracy, through a survey or by other means, and the mobile station data and reference station data are downloaded to the supplemental station after the data are collected.

Alternatively, relevant data obtained by the reference station 31 may be collected and downloaded to the mobile station 11, for subsequent processing by the mobile station. Alternatively, relevant data obtained by the reference station and by the mobile station may be collected downloaded for subsequent processing by the reference station 31.

The reference station 31 also has an SATPS signal antenna 33 and SATPS signal receiver/processor 35 that receives and processes SATPS signals from the M SATPS satellites 21, 23, 25 and 27. The reference station 31 can determine the pseudorange corrections $PRC(t_f;j;\text{ref})$ for its own (known) location and time of measurement, using the SATPS signals received from these four (or three) satellites (j=1, 2, 3, 4 or j1, j2, j3, j4). The supplemental station 36 includes a downloading receiver and associated port 38 (or receiver and associated antenna) that receive signals from the mobile station downloader 18 and from a downloader 34 for the reference station 31. If the reference station 31 serves as the supplemental station 36, the downloader 34 is deleted.

In one approach to determination of the location fix coordinates for an SATPS mobile station, a nominal solution with location fix coordinates (x0,y0,z0,b0) is determined in some neighborhood of a location of interest (preferably within 100 km) with as yet unknown location fix coordinates (x,y,z,b), where the nominal solution approximately satisfies the pseudorange relations $$\{(x0-x_j(t_f))^2+(y0-y_j(t_f))^2+(z0-z_j(t_f))^2\}^{1/2}+b0=PR(t_f;j;\text{nom}), \quad (1)$$

Here $PR(t_f;j;\text{nom})$ is the pseudorange, measured from SATPS satellite number j (j=1, 2, . . . , N) with ionosphere and troposphere time delay contributions modeled and removed, to the nominal spatial location with coordinates (x0,y0,z0) at a time $t=t_f$. Here, b0(t) is the computed but uncorrected clock bias for the nominal solution. In this invention, the nominal solution (x0, y0, z0, b0) for the location fix coordinates is taken to be the uncorrected location fix coordinates computed for the mobile station $(x'_{mob}, y'_{mob}, z'_{mob}, b'_{mob})$ from the SATPS signals received at the mobile station at the time $t=t_f$. The formalism used here is set forth by P.S. Jorgensen in "Navstar/Global Positioning System 18-satellite Constellations," Navigation, vol. 2, 1984, pp. 1–12, Appendix B.

For a location of interest, such as the unknown corrected spatial location and clock bias coordinates (x,y,z,b) of an SATPS station, a similar equation applies, viz.

$$\{(x-x_j(t_f))^2+(y-y_j(t_f))^2+(z-z_j(t_f))^2\}^{1/2}+b==PR(t_f;j;S), \quad (2)$$

where "S" refers to the spatial location of interest and $j=1, 2, \ldots, M$ for the M different satellites in view from that location. Equation (2) is rewritten in the form $$\{(x-x0+x0-x_j(t_f))^2+(y-y1+y0-y_j(t_f))^2+(z-z0+z0-z_j(t_f))^2\}^{1/2}+b0+(b-b0)=PR(t_f;j;nom)+PRC(t_f;j;nom), \quad (3)$$

$$PRC(t_f;j;nom)=PR(t_f;j;S)-PR(t_f;j;nom), \quad (4)$$

a Taylor series expansion is carried out in Eq. (3), with the differential quantities being displacement variables $\Delta x=x-x0$, $\Delta y=y-y0$, $\Delta z=z-z0$ and $\Delta b=b-b0$, and all terms of degree higher than one in the differential quantities are initially ignored. The collection of lowest order terms in this resulting relation satisfies Eq. (1) so that after cancellation of these terms the resulting approximations to Eqs. (3) for the M different satellites become expressible in matrix form as $$H(t_f;mob) \Delta W(t_f;mob)=PRC(t_f;mob), \quad (5)$$

$$H(t_f;mob)=(h_{ji}(t_f)), \quad (6)$$

$$h_{j1}(t_f)=\alpha_{j1}(t_f)=(x0-x_j(t_f))/r_{0j}, \quad (7)$$

$$h_{j2}(t_f)=\alpha_{j2}(t_f)=(y0-y_j(t_f))/r_{0j}, \quad (8)$$

$$h_{j3}(t_f)=\alpha_{j3}(t_f)=(z0-z_j(t_f))/r_{0j}, \quad (9)$$

$$h_{j4}(t_f)=1, (i=1, 2, 3, \ldots, M), \quad (10)$$

$$r_{0j}(t_f)=\{(x0-x_j(t_f))^2+(y0-y_j(t_f))^2+(z0-z_j(t_f))^2\}^{1/2}, \quad (11)$$

$$\Delta W(t_f;mob)^{tr}=W(t_f;mob)^{tr}-W0^{tr}=[\Delta x\ \Delta y\ \Delta z\ \Delta b]^{tr}, \quad (12)$$

$$PRC(t_f;mob)^{tr}=[PRC(t^f;M;mob) \ldots PRC(t_f;M;mob)]. \quad (13)$$

Here, the matrix $H(t_f;mob)$ is determined by the reference station (or by the mobile station, or by a third SATPS receiver/processor that receives downloaded data from the mobile station), using location fix coordinates determined at or near the estimated, uncorrected location of the mobile station. Normally, this will be done by (post-)processing at a supplemental station, after the necessary data are downloaded from the mobile station. If this processing is not done at the reference station, the reference station need only measure and (optionally) store the pseudorange signal values and determine the pseudorange corrections for these values.

The location fix coordinates correction vector $\Delta W(t_f;mob)$ represents displacements of the location fix coordinates for the estimated location of the mobile station relative to the location fix coordinates for the location at which a nominal (uncorrected) solution is available and known. The vector $PRC(t_f;mob)$ represents displacements of the uncorrected pseudorange values for the estimated location of the mobile station relative to the pseudorange values for the location at which the nominal solution is available and known.

In practice, a pseudorange corrections vector $PRC(t_f;ref)$, computed based on the known spatial location coordinates for the SATPS satellites, $(x_j(t_f), y_j(t_f), z_j(t_f))$ and for the reference station, is used for the mobile station pseudorange corrections vector $PRC(t_f;mob)$. Methods for computing the entries of the vector $PRC(t_f;ref)$ are well known in the art.

Equation (5) relates the spatial location and clock bias corrections $(\Delta x,\Delta y,\Delta z,\Delta b)$ (to be determined; referred to collectively here as the "location fix coordinate corrections") to measurable or determinable differences in pseudorange parameters $PRC(t_f;j;0)$ for the M satellites. Each of the entries $h_{ji}(t_f)$ ($j=1, 2, 3$) in this first transformation matrix $H(t_f;mob)$ depends upon the direction cosines $\alpha_{ji}(t_f)$ of the vector extending from the nominal solution location to the present location of each of the M satellites and can be computed from a knowledge of the ephemerides of the M in-view satellites. The M×4 matrix $H(t_f;mob)$ relates the pseudorange corrections or innovations vector $PRC(t_f;mob)$ to the location fix coordinate corrections $(\Delta x,\Delta y,\Delta z,\Delta b)$ relative to the nominal solution corrections. This matrix $H(t_f;mob)$ is obtained from a first order expansion of the actual solution about the nominal solution and, therefore, provides approximate coordinate corrections. Other formalisms can be used here, but the form obtained for the resulting linearized relations is that of Eq. (5).

The mobile station uncorrected location fix coordinate corrections vector $\Delta W(t_f;mob)=[\Delta x\ \Delta y\ \Delta z\ \Delta b]^{tr}$ is computed by the supplemental data processing station for the estimated location of the mobile station 11 after the mobile station data and the reference station data are provided. The location fix coordinate values downloaded are chosen for efficiency, not necessarily for ease of computation. The spatial location coordinates of the mobile station 11 have modest dynamic ranges, such as a few hundred meters, because the spatial location changes relatively slowly, if at all. The clock bias coordinate, if it is used, also has a limited dynamic range. Further, the total number (four or three) of these location fix coordinate values is manageable and can be stored in a memory as four (or three) double precision numerical values. If, on the other hand, the mobile station pseudorange values are to be stored and later downloaded to the reference station, the possible dynamic ranges are much larger; specification of the time coordinate requires sub-millisecond accuracy; and full range storage/downloading of the pseudorange values would probably require 4 M double precision coordinate values for the satellites. Thus, 8 bytes are required for storage and downloading of the location fix coordinate values, and 4 M bytes would be required for storage/downloading of the pseudorange values, with $M \geq 4$. Storage/downloading of the index number (for example, 1–24) of each of the M SATPS satellites signals whose pseudorange measurements are used to determine the (uncorrected) location coordinates adds approximately 5 M/8 bytes, whether the pseudoranges or the location coordinates are transmitted.

Thus, the number of bytes required for storage/downloading of the necessary mobile station information to the supplemental station is approximately 8+5 M/8 bytes, if location fix coordinate values are sent, and is approximately 4.625 M bytes, if pseudorange values are sent; for example, if M=6, these numbers become roughly 12 bytes and 27 bytes, respectively. Thus, the savings in number of bytes stored and downloaded is substantial.

The uncorrected location fix coordinates $(x,y,z,b)_{unc}$ received from the mobile station are used to compute the matrix $H(t_f;mob)$. Although these uncorrected coordinate values have inherent inaccuracies, these inaccuracies are likely to be relatively small (under 30 meters) and the entries for the matrix $H(t_f;mob)$ are close to what should be used in Eq. (5) to relate the pseudorange corrections to the location fix corrections at the mobile station.

The entries for the uncorrected location fix coordinate corrections vector $\Delta W(t;mob)=[\Delta x\ \Delta y\ \Delta z\ \Delta b]^{tr}$, a 4×1 vector determined from uncorrected pseudorange measurements on the M satellites made by the mobile station 1, are received at the reference station 31 and must be used to determine a corrections vector $PRC(t_f;mob)$ for the user location for each of the satellites $j=1, 2, \ldots, M$. Initially, a four-dimensional vector space $S_H$ is spanned by the four columns of the M×4 matrix $H(t_f;\text{mob})$, with each column having M entries. Each of the four ordered columns of entries in $H(t_f;\text{mob})$ is also a vector in an expanded M-dimensional vector space $S_{H^*}$. The four-vector $\Delta W(t_f;\text{mob})$ is extended to an M-vector $\Delta W^*(t_f)$ that includes the original four-dimensional vectors that are part of the vector space $S_H$.

The space $S_{H^*}$ is spanned by the vectors in the space $S_H$ and by $M-4$ additional, independent vectors in $S_{H^*}$. If $M=4$, $S_{H^*} = S_H$, as noted above. These $M-4$ additional, linearly independent vectors can be found by the Gram-Schmidt orthogonalization process applied to the four M-entry column vectors of the H matrix, or by any other suitable process for vector space augmentation. The Gram-Schmidt orthogonalization process is discussed in R. Courant and D. Hilbert, *Methods of Mathematical Physics*, Interscience Publishers, New York, 1937, vol. 1, pp. 50–51.

By this process, the matrix $H(t_f;\text{mob})$ becomes an augmented M×M matrix $H^*(t_f;\text{mob})$ in the space $S_{H^*}$, with non-zero determinant. The matrix $H^*(t_f;\text{mob})$, therefore, has an inverse, $(H^*(t_f;\text{mob}))^{-1}$ in the space $S_{H^*}$, and one can set down an inverted form of Eq. (1) as $$\Delta W^*(t_f;\text{mob}) = H^*(t_f;\text{mob})^{-1} PRC(t_f;\text{mob}), \quad (14)$$

where $\Delta W^*(t_f;\text{mob})$ is an M-dimensional extension of the four-vector $\Delta W(t_f;\text{mob})$ in the extended space $S_{H^*}$. Equation (14) is used by the supplemental station 36 to recover the coordinate value corrections $\Delta W^*(t_f;\text{mob})$ that would be computed at the mobile station's location, if the pseudorange corrections were available at that station. The mobile station uncorrected location fix coordinate values are then corrected by application of the pseudorange corrections, computed at the reference station 31 but using initial, uncorrected coordinate fix values computed for the estimated mobile station location. The corrected pseudorange values for the mobile station 11 are then used to determine the corrected location fix coordinates (x,y,z,b) of the mobile station according to the equation $$W^*(t_f;\text{mob}) = W^*(t_f;\text{mob})_{unc} + \Delta W^*(t_f;\text{mob}) = W^*(t_f;\text{mob})_{unc} + H^*(t_f;\text{mob})^{-1} PRC(t_f;\text{mob}), \quad (15)$$

where $W^*(t_f;\text{mob})_{unc} = [x\ y\ z\ b\ \ldots\ ]_{unc}^{tr}$ is an M×1 matrix whose last $M-4$ entries may have any values, because their effects are ignored. The matrix $\Delta W^*(t_f;\text{mob})$ contains the location fix coordinate corrections $(\Delta x, \Delta y, \Delta z, \Delta b)_{cor}$ for the mobile station, together with $M-4$ other entries.

Optionally, the clock offset coordinate b can be ignored or discarded, because the location displacement due to provision of a realistic clock offset value b is estimated as at most 0.5 meters. If the clock offset coordinate b is ignored here, the location fix coordinate coordinate vector $W(t_f;\text{mob})$ becomes a 3×1 vector, which is extended by analogy with the above procedure to an M×1 location fix coordinate matrix $W^*(t_f;\text{mob})$ in a corresponding augmented M-dimensional space $S_{H^*}$ of dimension M ($M \geq 3$).

Optionally, corrections to one of the spatial location coordinates, say z, can also be ignored so that the uncorrected value z' for this coordinate is used without further processing. In this situation the location fix coordinate coordinate vector $W(t_f;\text{mob})$ becomes a 3×1 vector, containing only the coordinates x' and y', which is extended by analogy with the above procedure to an M×1 location fix coordinate matrix $W^*(t_f;\text{mob})$ in a corresponding augmented M-dimensional space $S_{H^*}$ of dimension M ($M \geq 3$). Where corrections to the coordinates b and/or z are ignored, the satellite-nominal location distance $r_{0j}(t_f)$ continues to be computed using Eq. (11).

Four of the entries in the corrected location fix coordinate matrix $W^*(t_f;\text{mob})$ correspond to, and are interpretable as, the respective four corrected location fix coordinates x, y, z and b for the matrix $W(t_f;\text{mob})$. In a preferred embodiment, these four entries are the first four entries of the matrix $W^*(t_f;\text{mob})$, and the first four entries of the M×1 matrix $W^*(t_f;\text{mob})$ in Eq. (15) become the corrected location fix coordinate values x, y, z and b. The reference station and the mobile station must agree on a format for these entries, and the supplemental station must receive the uncorrected location fix coordinates in an agreed order, such as x, y, z, b, or some other order. It is preferable, but not necessary, that all mobile stations transmit their uncorrected coordinate measurements (location coordinates and clock bias) in the same order.

In what order should the entries in the pseudorange corrections matrix $PRC(t_f;\text{mob})$ be arranged in Eqs. (14) or (15)? Recall that each entry in the matrix $PRC(t_f;\text{mob})$ corresponds to a different satellite. One suitable order, which must be agreed upon by the mobile station and the reference station, is to arrange the "fundamental set" of satellites (the "best" minimum set, usually four, needed to determine DSATPS corrections for the reference station, or for the mobile station) in decreasing order of whatever SATPS signal quality parameter $\kappa$ is used to determine this best set of satellites, then arrange the entries in the matrix PRC $(t_f;\text{mob})$ for the remaining in-view satellites in decreasing order of the parameter $\kappa$. Another approach is to arrange the fundamental set of satellites as set forth in the first approach, then arrange the entries for the remaining in-view satellites in an increasing or decreasing sequence for the satellite number. Many alternative approaches can be used here. However, the reference station and the mobile station should agree on the quality parameter $\kappa$ or other criterion to be used for this ordering. This method can be implemented as illustrated in FIG. 2.

In step 141, the mobile station receives SATPS signals from M SATPS satellites j=1, ..., M and determines and stores the uncorrected location fix coordinates $(x_n, y_n, z_n, b_n)_{unc}$ for that station, for a sequence of times $t = t_f = t_n (n=1, 2, \ldots)$.

In step 143, the mobile station and the reference station download the location fix coordinate values $(x_n, y_n, z_n, b_n)_{unc}$ and the pseudorange corrections data $PRC(t_n;\text{ref})$ for the sequence of times $t=t_n$ to the supplemental station. The times $t=t_n$ themselves may be, but need not be, provided for the supplemental station.

In step 145, the reference station receives the SATPS signals from the same M SATPS satellites and determines the M×1 pseudorange correction matrix $PRC(t_n;\text{ref})$ for these measurements for the reference station, using the known reference station coordinates.

In step 146, the supplemental station determines if n=1; that is, if this is the first member ($t=t_n$ with n=1) of the sequence of location fix coordinates $(x_n, y_n, z_n, b_n)_{unc}$ received from the mobile station.

If n=1, the reference station uses $(x_1, y_1, z_1, b_1)_{unc}$, formed using the initial uncorrected estimates of the mobile station location fix coordinates that are obtained solely from the SATPS signals received at or around the time $t=t_1$, to compute the matrices $H(t_1;\text{mob})$ and $\Delta W(t_1;\text{mob})$ in the space $S_H$, in step 147.

If $n \geq 2$, the supplemental station uses $(x_n, y_n, z_n, b_n)_{unc}$, formed using the uncorrected estimates of the mobile station location fix coordinates that are obtained from the SATPS signals received at or around the time $t=t_2$, to compute the matrices $H(t_n;\text{mob})$ and $\Delta W(t_n;\text{mob})$ in the space $S_H$, in step 148. Optionally, the supplemental station may replace the uncorrected mobile station location fix coordinates $(x_n, y_n, z_n, b_n)_{unc}$ by the set $(x_{n-1}, y_{n-1}, z_{n-1}, b_{n-1})_{cor}$, computed using the corrected location fix coordinates for the preceding time $t = t_{n-1}$.

In step 149, the supplemental station constructs the M×M extension $H^*(t_n;mob)$ of the matrix $H(t_n;mob)$ in the augmented space $S_{H^*}$, and constructs the inverse matrix $H^*(t_n;mob)^{-1}$. If M=4, $H^*(t_n;mob)=H(t_n;mob)$, and no augmentation of the space $S_H$ need be made.

In step 151, the supplemental station determines the M×1 coordinate value corrections matrix $\Delta W^*(t_n;mob)$ for the mobile station, using Eq. (14), and the corrected location fix coordinates $(x_n, y_n, z_n, b_n)_{cor}$ for the mobile station according to Eq. (15), and (preferably) stores these quantities.

In an optional step 153, the corrected coordinates $(x_n, y_n, z_n, b_n)$cor for the mobile station are transmitted to the mobile station or to another selected site, with a fixed total time delay $\Delta t(delay)$, so that the mobile station or other selected site receives the corrected coordinates for an earlier time $t'$ at a time $t = t' + \Delta t(delay)$.

In step 155, the time index n is incremented (n—n+1) and the reference station system returns to step 146 at least once. The steps 141–155 are easily modified to handle a situation where only the coordinates (x,y,z) or (x,y) are to be corrected.

The M×4 matrix $H(t_f;mob)$ can be generalized to an M×N matrix with $2 \leq N \leq M$ that relates M pseudorange values and other observables to N spatial and/or time coordinates. In this more general context, the N-dimensional space $S_H$ of M-dimensional vectors is embedded in, or expanded to, an M-dimensional space $S_{H^*}$, using a Gram-Schmidt orthogonalization procedure or some other suitable procedure that produces M independent vectors, beginning with the subspace $S_H$ of $S_{H^*}$. Here, for example, one can choose N=3 for determination of two spatial coordinates three spatial coordinates.

In a first alternative approach, a pseudo-inverse, written $H(t_f;mob)^{(-1)}$, is constructed in the space $S_H$ and is used together with Eq.(5) to re-express Eq. (14) as $$\Delta W^*(t_f;mob) = H(t_f;mob)^{(-1)}PRC(t_f;mob), \quad (16)$$

$$H(t_f;mob)^{(-1)} = (H(t_f;mob)^{tr}H(t_f;mob))^{-1}H(t_f;mob)^{tr}. \quad (17)$$

Here, the matrix $H(t_f;mob)^{tr} H(t_f;mob)$ is a 4×4 (or 3×3) matrix and is invertible so that Eq. (17) is well defined. The matrix H−1 is a one-sided inverse (pseudo-inverse) in the sense that $H(t_f;mob)^{(-1)}H(t_f;mob)=I$(the identity matrix in $S_H$), although the matrix $H(t_f;mob)H(t_f;mob)^{(-1)}$ may not be defined or well behaved. The quasi-inverse $H(t_f;mob)^{(-1)}$ definition in Eq. (17) may also be recovered using an ordinary (uniformly weighted) least squares approach to the solution of Eq. (5). The procedural steps illustrated in FIGS. 2A/2B apply as before.

Figure 2A:
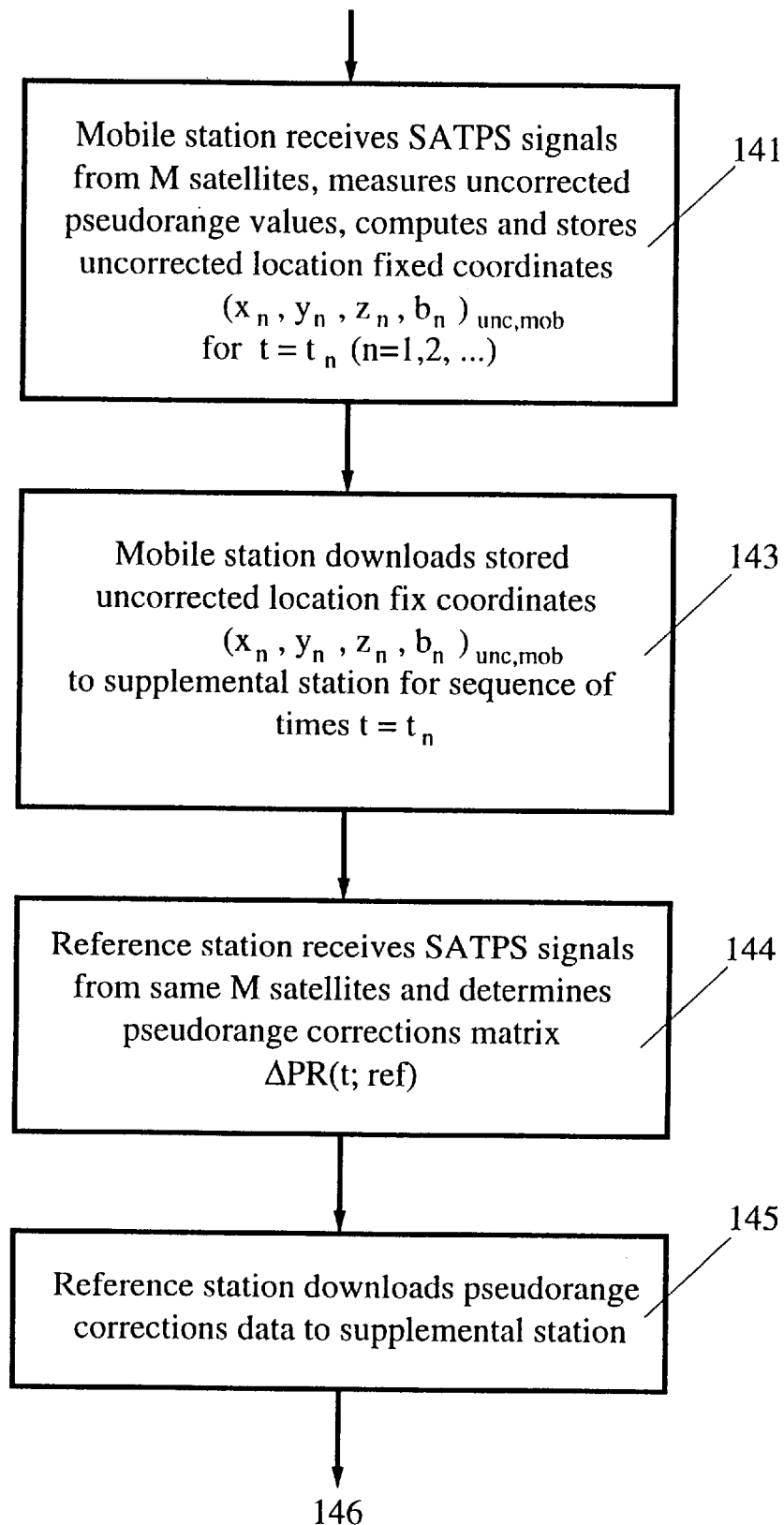
FIGS. 2A/2B and 3A/3B are flow diagrams illustrating use of the invention in two embodiments.
Figure 2B:
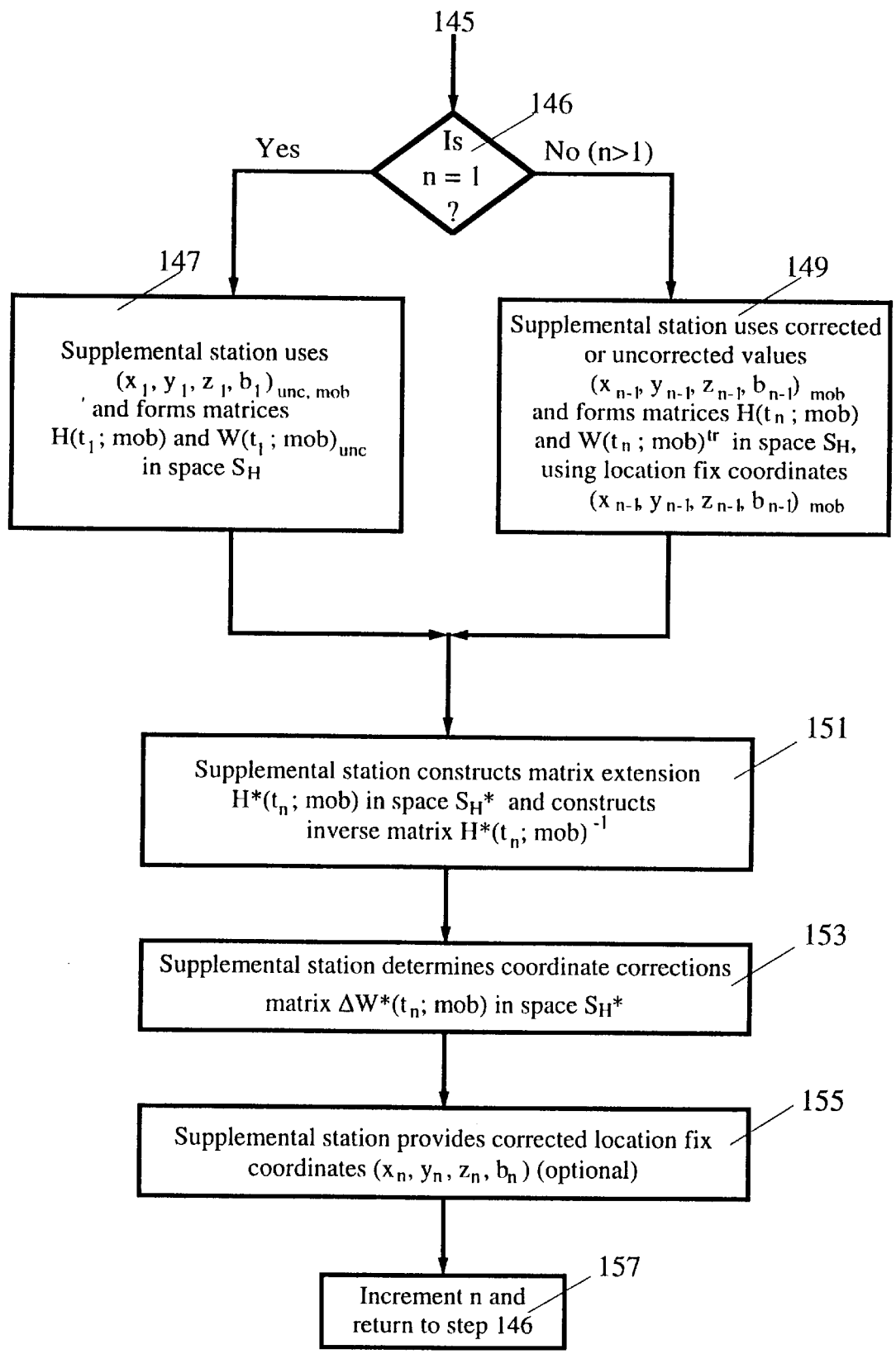

In a second alternative approach to the method illustrated in FIGS. 2A/2B, construction of an augmented vector space $S_{H^*}$ is not required. Using the matrix $H = H(t_f;mob)$, the supplemental station computes an M×1 matrix or vector $$v(t_f;mob)=[I-H(H^{tr}H)^{-1}H^{tr}]PR(t_f;mob)=K(t_f;mob)PR(t_f;mob), \quad (18)$$

where $PR(t_f;mob)$ is an M×1 matrix or vector whose entries are the pseudorange values measured at the mobile station. The M-vector $v = v(t_f;mob)$ is a projection onto a subspace orthogonal to the space $S_H^{tr}$, in the sense that $$H^{tr}v(t_f;mob)=H^{tr}K(t_f;mob)PR(t_f;mob)=0. \quad (19)$$

at the mobile station. Decompose v as a first vector component $v_f$ of dimensions P×1(P=2, 3 or 4) and a second vector component $v_{nf}$ (of dimensions (M−P)×1, with M usually $\leq 8$), viz.

$$v=[v_f|v_{nf}]^{tr}. \quad (20)$$

Here, the first P entries in the vector v correspond to pseudorange signals from the four satellites in the "fundamental set," for which a selected quality parameter κ for each of these satellite signals is higher than the κ values for any of the other in-view satellites (in the "non-fundamental set"). The quality parameter κ may be chosen to be the geometrical dilution of precision (GDOP) for the configuration of these P satellites; or κ may be chosen on some other basis. The known matrix $H^{tr}$ is similarly divided into a P×P sub-matrix $H_f^{tr}$ and an (M−P)×P sub-matrix $H_{nf}^{tr}$, in the following manner.

$$H^{tr}=[H_f^{tr}|H_{nf}^{tr}], \quad (21)$$

where the sub-matrix $H_f^{tr}$ has independent column vectors and is therefore invertible as a P×P matrix.

The fundamental set vector $v_f$ is then determinable from Eqs. (19) and (21) by the relation $$v_f = -(H_f^{tr})^{-1}H_{nf}^{tr}v_{nf} \quad (22)$$

The entries in the (M−P)×1 matrix or vector $v_{nf}$ correspond to the pseudorange corrections for the non-fundamental set of SATPS satellites and are constructed from Eq. (18). The non-fundamental set $v_{nf}$ of pseudorange data plus the uncorrected coordinates $(x_n, y_n, z_n, b_n)_{unc}$ (with $z_n$ and/or $b_n$ optionally deleted) are downloaded by the mobile station to the supplemental station, together with a set Σ of indicia indicating which satellites are included in the fundamental set and in the non-fundamental set. When the supplemental station receives the entries in the matrix $v_{nf}$, the matrices $H_{nf}^{tr}$ and $(H_f^{tr})^{-1}$ are constructed, using an estimate of the location coordinates of the mobile station or the location fix coordinates $(x_{n-1}, y_{n-1}, z_{n-1}, b_{n-1})_{unc}$ computed for the preceding time $t = t_{n-1}$, and the P-vector $v_f$ is constructed from Eq. (22). The vector v can be used to construct parity vectors and other useful measures of accuracy. The mobile station uncorrected pseudorange values are constructed, using the received mobile station coordinates $(x_n, y_n, z_n, b_n)_{unc}$, and can be corrected using the reference station pseudorange corrections $PRC(t_n;j;ref)$.

This approach does not require construction of an augmented vector space $S^{H^*}$ or construction of an inverse matrix $H^*(t_f;mob)^{-1}$. The original M×P matrix $H(t_f;mob)$ is divided into a P×P matrix $H_f$ and an (M−P)×P matrix $H_{nf}$, an inverse matrix $(H_f^{tr})^{-1}$ is formed, the matrix $(H_f^{tr})^{-1}H_{nf}^{tr}$ is formed, and the fundamental set P-vector $v_f$ is reconstructed at the reference station from the usually-fewer set of entries $v_{nf}$, using Eq. (22).

Figure 3A:
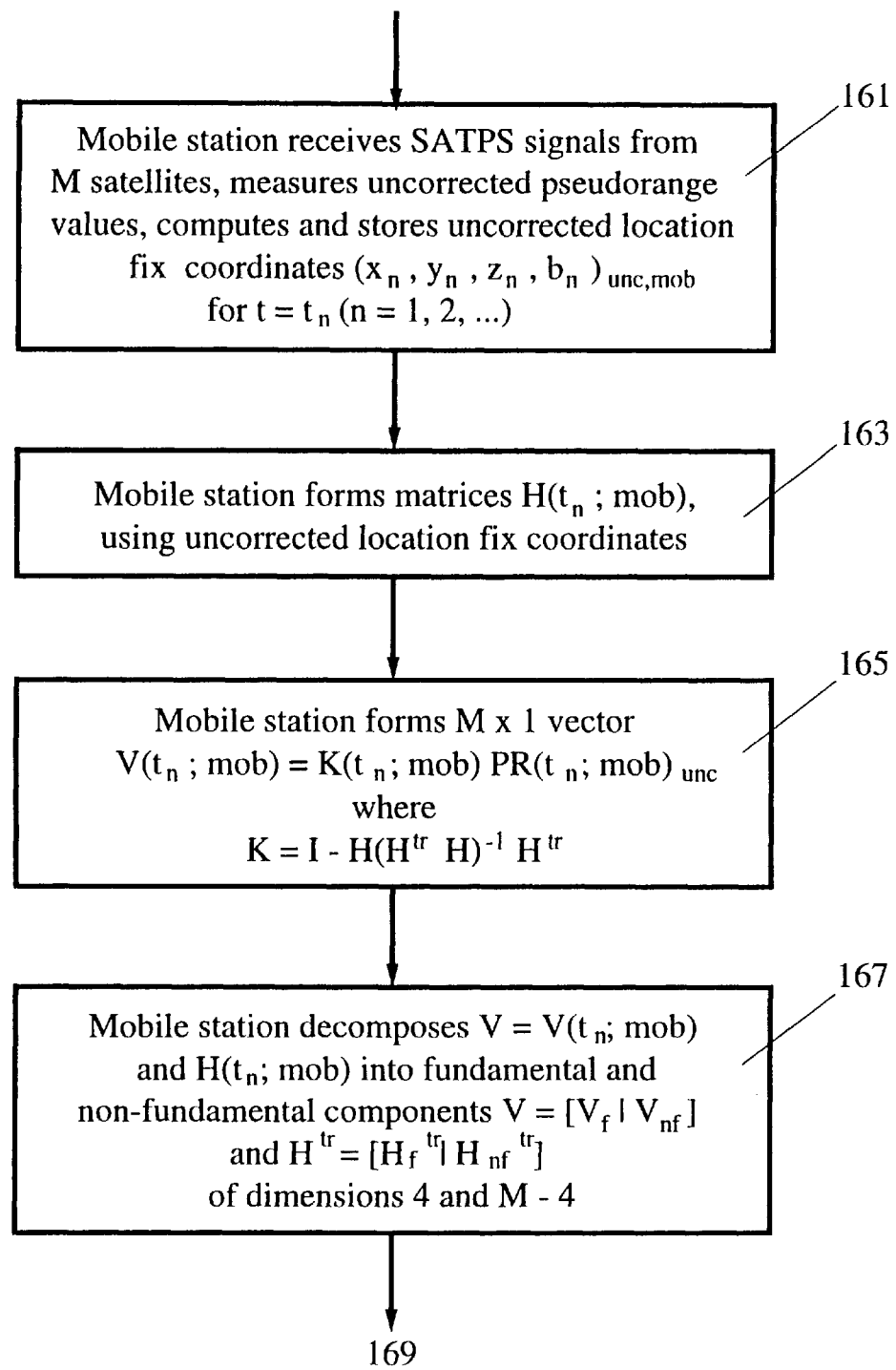
Figure 3B:
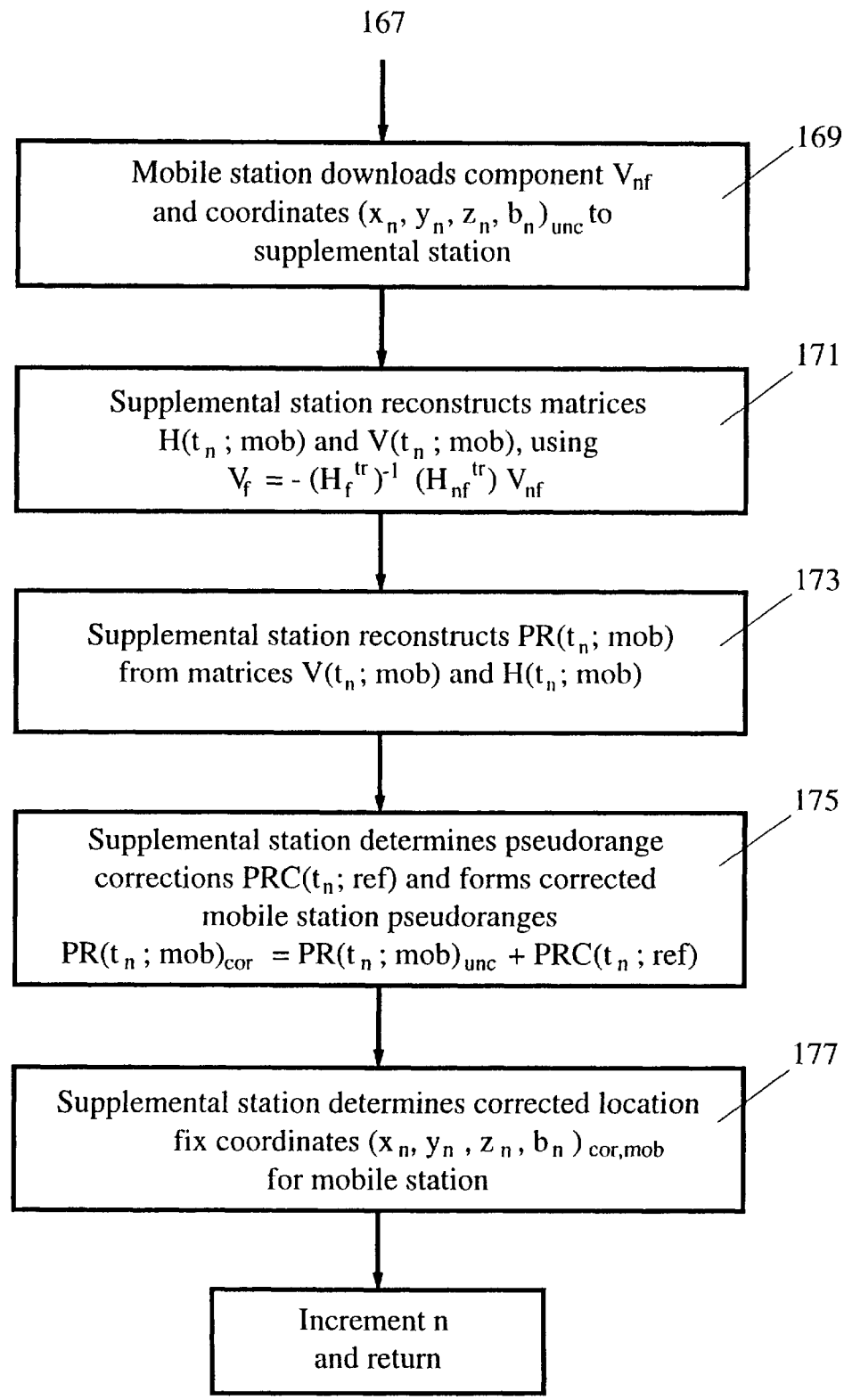

A suitable procedure for this alternative and preferred approach is illustrated in FIGS. 3A/3B for the choice P=4. In steps 161 and 163, the mobile station receives SATPS signals from M satellites, measures uncorrected pseudorange values $PR(t_n;j;mob)_{unc}$, forms the matrix $PR(t_n;mob)_{unc}$, computes and stores the uncorrected location fix coordinates $(x_n, y_n, z_n, b_n)$ for $t = t_n$ (n=1, 2, . . .) and computes the matrices $H(t_n;mob)$. In step 165, the vector $v = K \, PR(t_n;mob)$ is formed from the pseudorange values determined at the mobile station, using Eq. (18). Here, $$K(t_n;mob)=I-H(t_n;mob)(H(t_n;mob)^{tr}H(t_n;mob))^{-1}H(t_n;mob)^{tr}] \quad (23)$$

is formed using an estimate of the location coordinates of the mobile station or the location fix coordinates $(x_{n-1}, y_{n-1}, z_{n-}$ $1, b_{n-1}$)cor computed for the preceding time $t=t_{n-1}$. In step 167, the vector v is divided into a fundamental set vector $v_f$ and a non-fundamental set vector $v_{nf}$. In step 169, the entries for the non-fundamental set vector $v_{nf}$ are transmitted to the reference station, along with the fundamental set indicia $\Sigma$. In step 171, the fundamental set vector $v_f$ is reconstructed using Eq. (20). The mobile station pseudorange values are reconstructed from the vector components of $v_f$ and/or $v_{nf}$, in step 173. The reference station receiver/processor then applies the pseudorange corrections to the mobile station fundamental set and determines the corrected location fix coordinates for the mobile station at time $t=t_{n-1}$ in steps 175 and 177.

Equation (14) explicitly uses the pseudorange corrections matrix, $PRC(t_f;mob)$, and the inverse of the augmented H matrix, $H^*(t_f;mob)$, to compute the augmented location fix coordinate corrections matrix $\Delta W^*(t_f;mob)$. This formulation allows use of SATPS almanac data, which is changed once or twice per week, or use of SATPS ephemerides data, which is changed once every 1–4 hours and is more accurate than the almanac data.

Equation (14) may be recast in the form $$\Delta W^*(t_f;mob)=H^*(t_f;mob)^{-1} \{PR(t_f;ref)_{unc}-W^*(t_f;ref)-\\Ionocorr^*(t_f;ref)-Tropocorr^*(t_f;ref)\}, \quad (24)$$

where $W^*(t_f;ref)$ is an M×1 matrix whose entries are ranges between the reference station and the SATPS satellites j=1, 2, ..., M, computed using the same ephemeris data used by the mobile station, Ionocorr* is an M×1 whose entries are the computed or modeled ionospheric time delay corrections for SATPS signal propagation from each of the M satellites, and Tropocorr* is an M×1 matrix whose entries are the computed or modeled tropospheric time delay corrections for SATPS signal propagation from each of the M satellites.

When Eq. (14) is recast as Eq. (24), SATPS ephemerides data must be used, because the range data and/or the pseudorange data change much faster than the pseudorange corrections data used in Eq. (14). The uncorrected pseudorange data $PR(t_f;ref)$ and pseudorange corrections PRC $(t_f;ref)$ should be computed for the same time $t=t_f$ as used for the mobile station location fix; this may require interpolation of the pseudorange data.

The preceding development may be characterized in the following manner. At the mobile station, the differences in corrected pseudorange values $\Delta z$ between the mobile station (z) and the reference station $(z_0)$ is related to the differences in corrected location fix coordinate values $\Delta x$ between the mobile station (x) and the reference station $(x_0)$ by the relation $$z-z_0=H(t_f;mob)(x-x_0), \quad (25)$$

where H(t;mob) is as described above, $z_0$ is an M×1 vector representing the corrected pseudorange values at the reference station and $x_0$ is a 4×1 (or 3×1) vector representing the corrected location fix coordinates for the reference station. The difference $\Delta z^u$ between the corrected reference station pseudorange values $(z_0)$ and the uncorrected reference station pseudorange values $(z_0^u)$ is given by $$\Delta z^u = z^u z_0. \quad (26)$$

The corrected pseudorange values vector for the mobile station is here taken to be $$z=z^u+PRC(t_f;mob)\approx z^u+PRC(t_f;ref). \quad (27)$$

After a linear transformation $H(t_f;mob)^{-1}$ has been constructed, an uncorrected location fix coordinates vector $x^{\wedge u}$ for the mobile station is related to the known (and a fortiori correct) location fix coordinates vector $x_0$ for the reference station by the relations $$x^{\wedge u}=H(t_f;mob)^{-1}\Delta z_u+x_0. \quad (28)$$

If $x^\wedge$ represents the best estimate of the location fix coordinates for the mobile station, then $$x^\wedge=H(t_f;mob)^{-1}(z-z_0)+x_0$$

$$=H(t_f;mob)^{-1}(z-z_0)+x^{\wedge u}-H(t_f;mob)^{-1}(z^u-z_0)$$

$$=H(t_f;mob)^{-1}(z-z^u)+x^{\wedge u}$$

$$=H(t_f;mob)^{-1}PRC(t_f;ref)+x^{\wedge u}, \quad (29)$$

which is the relationship developed above.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (1.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz.

The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f(delay $f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B, July 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, pp. 1–90.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.80 relative to the equator, and the three orbital planes are separated from each other by multiples of 1200 longitude. The GLONASS circular orbits have smaller radii, about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9 \ k/16)$ GHz and $f2=(1.246 +7 \ k/16)$ GHz, where k (=0, 1, 2, ..., 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential correction determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon in *The NAVSTAR Global Positioning System*, Van Nostrand Reinhold, 1992, op cit.

I claim:

1. A method for determining corrections for spatial location and clock bias coordinates with enhanced accuracy for a mobile Satellite Positioning System (SATPS) station, the method comprising the steps of:

obtaining an M×1 pseudorange corrections matrix, whose entries are corrections for each of M uncorrected pseudorange values, measured at an SATPS reference station that has known location coordinates and that receives SATPS signals and measures uncorrected pseudorange values approximately at a selected location fix time from each of M selected visible SATPS satellites, where M≧N and M and N are selected positive integers with N being one of the integers 2, 3 and 4, and where the sum of an uncorrected pseudorange value plus a pseudorange correction value for a selected visible satellite provides a corrected reference station pseudorange value that agrees with a known, correct pseudorange value at the reference station for the selected visible satellite at the location fix time;

receiving and processing SATPS signals from each of the M visible satellites at an SATPS mobile station, and determining an uncorrected location fix coordinate matrix, whose entries include uncorrected spatial location coordinates and an uncorrected clock bias coordinate, for the mobile station at the location fix time;

using the mobile station uncorrected location fix coordinate values and location coordinate values of at least one visible satellite, for a time corresponding to the location fix time, to compute an M×N transform matrix, with (N−1)·M entries of the transform matrix being direction cosines for a vector from a visible satellite to the uncorrected mobile station location, for each of the M visible satellites, and with M entries of the transform matrix having the value 1;

forming an N×M quasi-inverse matrix that is a left inverse for the transform matrix, in the sense that the matrix product of the quasi-inverse matrix, multiplied on the right by the transform matrix, is an N×N identity matrix;

forming an N×1 location fix corrections matrix that is a matrix product of the quasi-inverse matrix, multiplied on the right by the pseudorange corrections matrix; and interpreting N entries of the location fix corrections matrix as corrections to the location fix coordinates for the mobile station.

2. The method of claim 1, further comprising the step of selecting said integer M≧N+1, and wherein said steps of forming said N×M quasi-inverse matrix and forming said pseudorange corrections matrix comprise the steps of:

augmenting said transform matrix by adding M−N columns of matrix entries to produce an M×M augmented transform matrix, where N columns of the augmented transform matrix are identical with N columns of said transform matrix and a column of entries from the augmented transform matrix forms an M×1 column matrix that is linearly independent of the other M−1 column matrices of the augmented transform matrix;

forming an M×M augmented quasi-inverse matrix, that is a left inverse matrix for the augmented transform matrix, determining an M×1 augmented location fix corrections matrix as a matrix product of the augmented quasi-inverse matrix and said pseudorange corrections matrix; and interpreting N entries of the augmented location fix corrections matrix as corrections to said location fix coordinates for said mobile station.

3. The method of claim 2, wherein said step forming said augmented transform matrix comprises the steps of:

forming an M×1 vector from the values of said M entries in each column of said M×N transform matrix;

using a Gram-Schmidt orthogonalization procedure to form M−N additional M-dimensional vectors, with each such additional vector being linearly independent of each of the M-dimensional vectors formed from said matrix and with these M−N additional vectors being linearly independent of each other; and forming an augmented M×M transform matrix whose column entries are the entries of the N vectors formed from the matrix and the entries of the additional M−N vectors formed using a Gram-Schmidt orthogonalization procedure.

4. The method of claim 1, wherein said step of forming said N×M quasi-inverse matrix comprises the steps of:

forming an N×N intermediate matrix that is a matrix product of the N×M transpose of the transform matrix, multiplied on the right by the transform matrix; and defining said N×M quasi-inverse matrix as a matrix product of the intermediate matrix, multiplied on the right by the N×M transpose of the transform matrix.

5. The method of claim 1, further comprising the step of selecting said integer M=N and selecting the quasi-inverse matrix to be the inverse matrix for the transform matrix.

6. The method of claim 1, further comprising the step of computing said transform matrix at a supplemental data processor.

7. The method of claim 1, further comprising the step of computing said matrix transform at at least one of said mobile station and said reference station.

8. A method for determining corrections for spatial location and clock bias coordinates with enhanced accuracy for a mobile Satellite Positioning System (SATPS) station, the method comprising the steps of:

obtaining an M×1 pseudorange corrections matrix, whose entries are corrections for each of M uncorrected pseudorange values, measured at an SATPS reference station that has known location coordinates and that receives SATPS signals and measures uncorrected pseudorange values approximately at a selected location fix time from each of M selected visible SATPS satellites, where M≧N and M and N are selected positive integers with N being one of the integers 2 and 3, and where the sum of an uncorrected pseudorange value plus a pseudorange correction value for a selected visible satellite provides a corrected reference station pseudorange value that agrees with a known, correct pseudorange value at the reference station for the selected visible satellite at the location fix time;

receiving and processing SATPS signals from each of the M visible satellites at an SATPS mobile station, and determining an uncorrected location fix coordinate matrix, whose entries include uncorrected spatial location coordinates and an uncorrected clock bias coordinate, for the mobile station at the location fix time;

using the mobile station uncorrected location fix coordinate values and location coordinate values of at least one visible satellite, for a time corresponding to the location fix time, to compute an M×N transform matrix, where the entries of the transform matrix are direction cosines for a vector from a visible satellite to the uncorrected mobile station location, for each of the M visible satellites;

forming an N×M quasi-inverse matrix that is a left inverse for the transform matrix, in the sense that the matrix product of the quasi-inverse matrix, multiplied on the right by the transform matrix, is an N×N identity matrix;

forming an N×1 location fix corrections matrix that is a matrix product of the quasi-inverse matrix, multiplied on the right by the pseudorange corrections matrix; and interpreting N entries of the location fix corrections matrix as corrections to the location fix coordinates for the mobile station.

9. The method of claim 8, further comprising the step of selecting said integer M≧N+1, and wherein said steps of forming said N×M quasi-inverse matrix and forming said pseudorange corrections matrix comprise the steps of:

augmenting said transform matrix by adding M−N columns of matrix entries to produce an M×M augmented transform matrix, where N columns of the augmented transform matrix are identical with N columns of said transform matrix and a column of entries from the augmented transform matrix forms an M×1 column matrix that is linearly independent of the other M−1 column matrices of the augmented transform matrix;

forming an M×M augmented quasi-inverse matrix, that is a left inverse matrix for the augmented transform matrix, determining an M×1 augmented location fix corrections matrix as a matrix product of the augmented quasi-inverse matrix and said pseudorange corrections matrix; and interpreting N entries of the augmented location fix corrections matrix as corrections to said location fix coordinates for said mobile station.

10. The method of claim 3, wherein said step forming said augmented transform matrix comprises the steps of:

forming an M×1 vector from the values of said M entries in each column of said M×N transform matrix;

using a Gram-Schmidt orthogonalization procedure to form M−N additional M-dimensional vectors, with each such additional vector being linearly independent of each of the M-dimensional vectors formed from said matrix and with these M−N additional vectors being linearly independent of each other; and forming an augmented M×M transform matrix whose column entries are the entries of the N vectors formed from the matrix and the entries of the additional M-N vectors formed using a Gram-Schmidt orthogonalization procedure.

11. The method of claim 8, wherein said step of forming said N×M quasi-inverse matrix comprises the steps of:

forming an N×N intermediate matrix that is a matrix product of the N×M transpose of the transform matrix, multiplied on the right by the transform matrix; and defining said N×M quasi-inverse matrix as a matrix product of the intermediate matrix, multiplied on the right by the N×M transpose of the transform matrix.

12. The method of claim 8, further comprising the step of selecting said integer M=N and selecting the quasi-inverse matrix to be the inverse matrix for the transform matrix.

13. The method of claim 8, further comprising the step of computing said transform matrix at a supplemental data processor.

14. The method of claim 8, further comprising the step of computing said matrix transform at at least one of said mobile station and said reference station.

* * * * *